G. W. JOPSON.
Chucks for Metal Lathes.

No. 148,961.             Patented March 24, 1874.

Witnesses.

Geo. W. Jopson
Inventor
By Atty.

UNITED STATES PATENT OFFICE.

GEORGE W. JOPSON, OF WATERBURY, CONNECTICUT.

IMPROVEMENT IN CHUCKS FOR METAL-LATHES.

Specification forming part of Letters Patent No. 148,961, dated March 24, 1874; application filed February 18, 1874.

*To all whom it may concern:*

Be it known that I, GEORGE W. JOPSON, of Waterbury, in the county of New Haven and State of Connecticut, have invented a new Improvement in Drill-Chucks; and I do hereby declare the following, when taken in connection with the accompanying drawings and the letters of reference marked thereon, to be a full, clear, and exact description of the same, and which said drawings constitute part of this specification, and represent, in—

Figure 1:
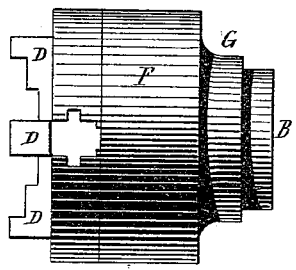
Figure 2:
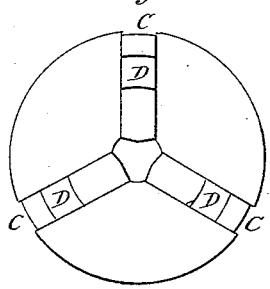
Figure 3:
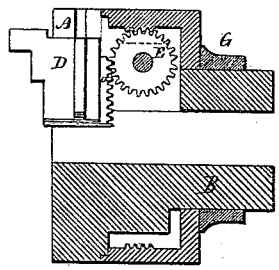

Figure 1, a side view; Fig. 2, a front or face view; Fig. 3, a longitudinal section on line $x\,x$.

This invention relates to an improvement in that class of chucks for lathes which have two or more jaws arranged in radial guides and moved simultaneously, so as to grasp and hold the article placed therein in an axial line with the center of the lathe, the object being to produce a simple and effective mode of operating the jaws; and the invention consists in two or more jaws arranged in a head in radial guideways, the said head provided with means of attachment to the lathe, combined with a pinion in rear of each jaw hung in the head, the axis of the said pinion transverse to the radial line of the jaws, the said pinions working into corresponding teeth on the back of their respective jaws, and a sleeve or barrel concentrically arranged upon the said head, and threaded upon its inner surface to work in the teeth of the said pinions, so that by revolving the said sleeve and holding the head, or vice versa, the pinions will be rotated and the jaws moved accordingly.

A is the head or face formed upon a shank, B, by which it is to be attached to the lathe, in substantially the usual manner for this class of chucks. In this head are three (more or less) radial grooves, C, within each of which is fitted a guide, D, to move in the said grooves radially to and from the center, also in the usual manner.

To operate these jaws simultaneously, I form a toothed rack, $a$, upon the back of each jaw, and in the head, in rear of each jaw, I arrange a pinion, E, the axis of the pinion transverse to the radial line of the jaws, and the teeth of the pinion working in the teeth of the rack, as seen in Fig. 3. On the head, and inclosing the pinion, is a sleeve, F, having a bearing upon the head, so as to be rotated concentric therewith, and prevented from longitudinal movement by a collar, G, or other device. This sleeve is threaded upon the inside, so that the threads will work in the teeth of the pinion, as seen in Fig. 3; therefore, by turning the sleeve and holding the head, or vice versa, the pinion E will be turned accordingly, and all together imparting to the jaws a corresponding radial movement, to force them to grasp the drill or other article placed between them and bring it to an axial line with the lathe-centers; or, if turned in the opposite direction, will release the article so held.

I claim as my invention—

The combination of the jaws D, arranged in the head A in radial guideways, the rack $a$ on the rear of the jaws, the pinions E, and the internally-threaded sleeve F, all substantially as specified.

GEORGE W. JOPSON.

Witnesses:
JOHN O'NEILL, Jr.,
WILLIAM REDFORD.